Patented Jan. 24, 1950

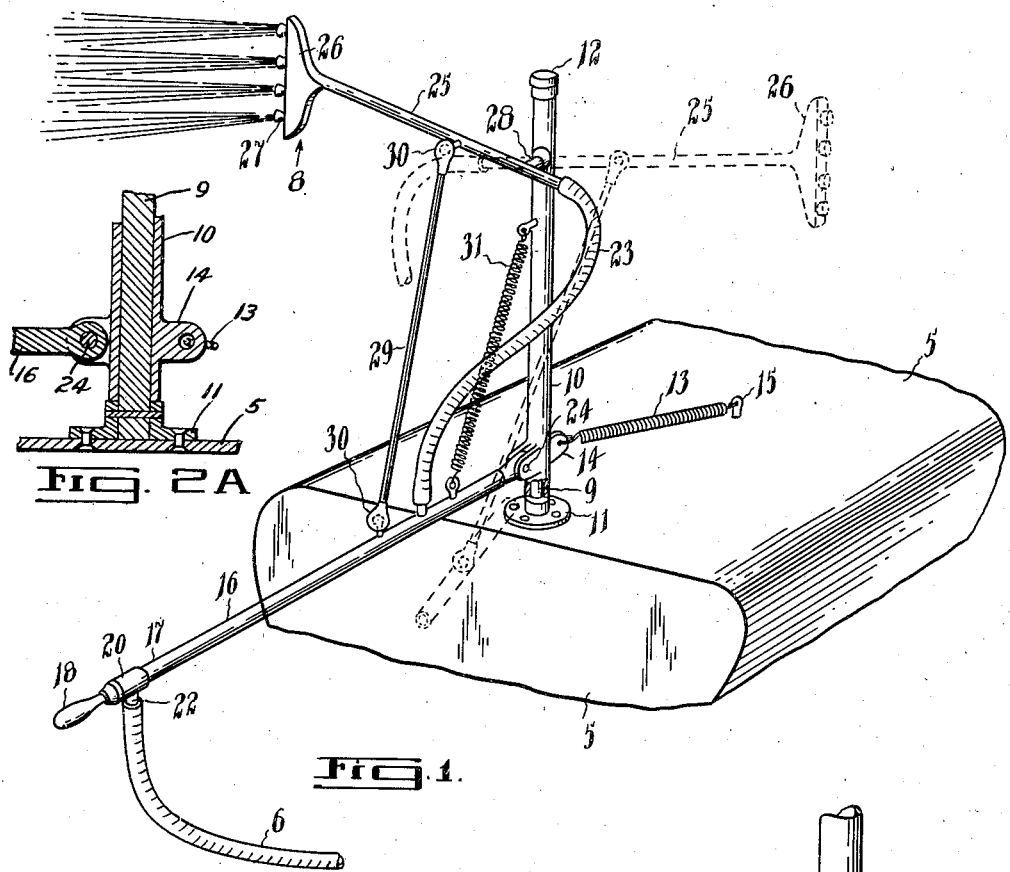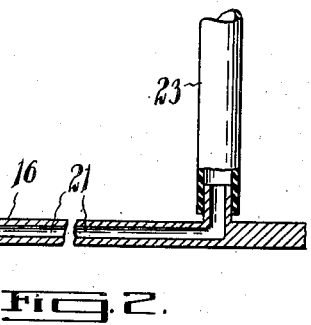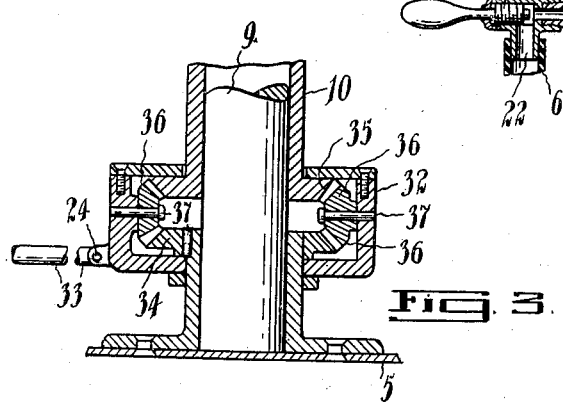

2,495,375

UNITED STATES PATENT OFFICE 2,495,375

SPRAYING APPARATUS

Alan Lishman, Pickering, Ontario, Canada, assignor of one-half to Ernest L. Ruddy, Pickering, Ontario, Canada Application July 25, 1945, Serial No. 606,949

7 Claims. (Cl. 299—72)

My invention relates to spraying attachments for tanks commonly used by fruit growers for spraying trees, vines and shrubs.

The commercialized wheeled tank containing the spraying fluid is usually drawn as by a tractor in performing the spraying operation. The spraying nozzle tube gun is manipulated by a man standing on a platform provided on the tank while another drives the tractor. Such a spraying apparatus therefore requires two men. The person standing on the platform has a hazardous task in endeavoring to keep his footing owing to the motion of the vehicle and to the slippery surface of the platform which becomes wetted by the spray.

Hence it is an object of my invention to provide a spraying apparatus which can be operated by a person driving the tractor which hauls the wheeled tank.

A further and important object is to provide a sprayer of this character in which the gun is capable of a universal movement and is devised so that it can be swung to either side of the tank by a hand lever. By this arrangement spraying can be performed at the right or left by merely turning the gun so that the nozzle is pointed to the side at which the work is to be done.

Another object is to provide a spraying apparatus in which the hand lever is manipulated similarly to the tiller of a boat and in which the fluid line from the tank is controlled by a valve on the hand lever adapted to be actuated by the grip portion thereof.

A distinctive feature of the invention is that it is highly serviceable for effectively spraying trees, et cetera, and can be manufactured at low cost.

Having related the major objects and advantages of the invention other objects will become apparent from the detailed description hereinafter given and the illustration shown in the accompanying drawing.

In the drawing, Fig. 1 is a perspective view of the invention applied to a liquid supply tank. In this view the gun is shown in full at one side of the tank and in dash lines at the other side thereof to indicate its reversed position.

Fig. 2 is a longitudinal section through the hand lever.

Fig. 2A is a vertical section of the lower end of the standard showing how it is mounted.

Fig. 3 is a vertical section of the hand lever connection with the gun standard and showing a modified arrangement by which a compound movement is produced.

The tank in association with which my invention is used is represented at 5 and is of a conventional type employed for holding a supply of the spraying liquid. The tank is mounted on wheels (not shown) and hitched to a tractor in carrying out a spraying treatment. It is supplied with a pump by which the spraying fluid is delivered under pressure through a hose line 6 to the gun.

In carrying out my invention I provide a rod or standard 9 having a suitable base plate 11 by which it is rigidly attached to the top of the tank 5 in the vicinity of the front end thereof and substantially medially of its width. A sleeve 10 the upper end of which is rotatably mounted on the said standard 9 and is closed as by a cap 12 is yieldably held against turning movement as by a coil spring 13 connected thereto at one end by a lug 14, the other end being anchored as at 15 to the tank.

A hand lever 16 is provided on the lower end of said sleeve to project radially therefrom in a forward direction and it is of a length such that its free end 17 may be within comfortable reach of a person seated on the tractor and capable of being swung behind him from one side to the other as well as being elevated and depressed. The distal end of said hand lever is supplied with a grip member 18 connected to a valve 19 in a valve-body 20 preferably integrated with the hand lever as shown. Valve 19 may be of the ordinary screw type of which said grip member constitutes a handle by which it may be turned on and off to control a passage 21 in said hand lever. Said valve has a nipple 22 by which it is connected to the hose line 6. The passage 21 has an outlet located toward the inner end of the hand lever, which is connected to a short length of flexible tubing 23 extending to the gun 8. The hand lever is pivoted at 24 to the sleeve 10 of said standard for movement in a vertical plane.

The gun 8 is comprised of a non-flexible tubular rod 25 having a head 26 at one end including nozzle elements 27. The other end thereof is attached to the flexible conduit 23, and adjacent to this end the gun is pivoted as at 28 to the sleeve 10 of said standard for swinging in a vertical plane at right angles to said hand lever.

A tie rod 29 is arranged to connect the gun 25 to the hand lever at points spaced from their pivots. The connections 30 of the tie rod are formed by universal joints such as ball-and-socket devices. Desirably a tension spring 31 is arranged between the hand lever and the sleeve to normally retain the lever in a conveniently elevated position and to so balance the gun that little effort is required to manipulate it.

The structure provides a device by which the operator of the tractor can from his seated position thereon not only actuate the valve 19 in the flow line but can handle the lever 16 to manipulate the gun for directing it in all desirable directions for efficiently spraying trees, et cetera as the tank is hauled along. Lateral movement of the lever imparts a coinciding movement to the gun when it is positioned at either side of the tank and it can be elevated and depressed as will be clearly understood. Moreover it has the additional feature of being capable of swinging from one side to the other of the tank for reversing it for right or left spraying operations. The spray gun is usually disposed at either side of the tank for carrying out a spraying operation. In swinging the spray gun from one side to the other in a reversing operation the momentum of the parts by which the head 26 is supported and manipulated is relied upon to carry the spray gun over dead centre. The reversing operation is accomplished by raising the hand lever with sufficient force to carry the spray gun over dead centre.

In spraying apparatus utilizing a tank of a large capacity there is an increased gap between the front end of the tank and the tractor. This requires a longer hand lever which could not be as conveniently operated insofar as a full side sweep is concerned because of the operator's limited reach. This may be overcome by employing a hand mechanism as shown in Fig. 3 in which the hand lever has a compound movement whereby the broom is turned about the vertical at an increased ratio to the angle of movement of the hand lever.

In this variant structure the standard 9 and the sleeve 10 of the standard are encompassed at their base portions by a gear case 32 which is independently rotatable and is rigid with the hand lever, denoted at 33. The case 32 contains a pair of bevel gears 34 and 35, one is rigid with the standard 9 and the other of which is rotatable with the sleeve. These gears are in mesh with pinions 36 journalled by studs 37 on the case. The gearing is of the differential type and it will be evident that a given angular movement of the hand lever will be translated into a greater angular movement of the sleeve 10 according to the gear ratio. As a result the gun can be swung horizontally with only a comparatively short movement on the part of the handle 33.

It will be manifest that the invention provides a spraying apparatus of a novel and highly serviceable construction and that such changes and variations may be made from the specific embodiment herein disclosed as come within the scope of the subjoined claims.

What I claim is:

1. Spraying apparatus comprising a standard having a base part by which it is vertically supported, a sleeve mounted on said standard for rotation about the vertical axis thereof, a spray gun pivoted on the upper end of said sleeve on a horizontal axis to rotate in a vertical plane, a flexible tubing extending from said spray gun for connection to a source of spraying liquid, a hand lever pivoted on the lower end of said sleeve on a horizontal axis for vertical movement, the pivotal axis of said hand lever being arranged at substantially right angles to that of said spray gun, and a tie rod pivotally connected to said spray gun and to said hand lever, the pivotal connections of said tie rod permitting universal movement thereof, and said tie rod being so proportioned in length relative to the distance between the pivot points of the spray gun and the hand lever on the standard plus the sum of the distances between these pivot points and the pivot points of the tie rod on the spray gun and the hand lever as to enable the hand lever to turn the spray gun over the dead centre of its pivot from either side of the standard utilizing the momentum of the moving parts of the structure to carry the spray gun over dead centre.

2. A structure as set forth in claim 1, in which means are provided whereby the hand lever is adapted to turn the sleeve with a compound movement so that the sleeve is moved through a greater angle than the angle through which the hand lever is swung, said means including a differential gearing connected to the sleeve.

3. Spraying apparatus comprising a standard having a base part by which it is vertically supported, a sleeve mounted on said standard for rotation about the vertical axis thereof, a non-flexible tubular rod provided at one end with a nozzle and being pivoted adjacent to its other end on the upper end of said sleeve on a horizontal axis, said rod and nozzle forming a spray gun which is rotatable in a vertical plane on said pivot of said rod, a flexible tubing extending from said spray gun for connection to a source of spraying liquid, a hand lever pivoted on the lower end of said sleeve on a horizontal axis for vertical movement, the pivotal axis of said hand lever being arranged at substantially right angles to that of said spray gun, and said tie rod being so proportioned in length relative to the distance between the pivot points of the spray gun and the hand lever on the standard plus the sum of the distances between these pivot points and the pivot points of the tie rod on the spray gun and the hand lever as to enable the hand lever to turn the spray gun over the dead centre of its pivot from either side of the standard utilizing the momentum of the moving parts of the structure to carry the spray gun over dead centre.

4. A structure as set forth in claim 3, in which the hand lever has a grip end, and in which a hand valve is carried on said grip end and operably connected to the flexible tubing for controlling passage of liquid to the spray gun.

5. A structure as set forth in claim 3, in which the hand lever is provided with a passage through its length to which the flexible tubing is connected, said hand lever having a grip portion and in which a hand valve controls said passage, said hand valve being mounted on said hand lever and having a handle at said grip portion and being devised for connection to a hose line from a source of liquid.

6. A structure as set forth in claim 3, in which the sleeve is yieldably held against turning on the standard by means of a spring.

7. A structure as set forth in claim 3, in which a spring is provided on the sleeve to stress the hand lever upwardly.

ALAN LISHMAN.

REFERENCES CITED

The following references are of record in the file of this patent:

UNITED STATES PATENTS

| Number | Name | Date |
|---|---|---|
| 912,894 | Ryan | Feb. 16, 1909 |
| 2,365,755 | Griffith | Dec. 26, 1944 |